(12) United States Patent
Kuhlman et al.

(10) Patent No.: US 11,693,399 B2
(45) Date of Patent: Jul. 4, 2023

(54) SYSTEMS AND METHODS FOR MARKET BASED DECONFLICTION FOR UNMANNED TRAFFIC MANAGEMENT

(71) Applicant: GE Aviation Systems LLC, Grand Rapids, MI (US)

(72) Inventors: Michael Joseph Kuhlman, Malden, MA (US); Anup Menon, Palo Alto, CA (US); Ray Yip Chow, Waltham, MA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 301 days.

(21) Appl. No.: 17/009,009

(22) Filed: Sep. 1, 2020

(65) Prior Publication Data
US 2022/0066443 A1    Mar. 3, 2022

(51) Int. Cl.
*G05D 1/00*    (2006.01)
*B64C 39/02*    (2023.01)
(Continued)

(52) U.S. Cl.
CPC ......... *G05D 1/0016* (2013.01); *B64C 39/024* (2013.01); *G08G 5/0026* (2013.01);
(Continued)

(58) Field of Classification Search
CPC ...... G05D 1/0016; G05D 1/00; B64C 39/024; B64C 2201/146; B64C 39/02;
(Continued)

(56) References Cited

U.S. PATENT DOCUMENTS 7,612,716 B2 *  11/2009  Smith ................. G08G 5/0082
                                                    342/454
7,667,647 B2 *   2/2010  Breen ....................... G01S 5/06
                                                    342/450
(Continued)

FOREIGN PATENT DOCUMENTS

WO    2019012713 A1    1/2019

OTHER PUBLICATIONS

Extended European Search Report for EP Application No. 21192926.0 dated Feb. 4, 2022 (10 pages).
(Continued)

*Primary Examiner* — Yonel Beaulieu
(74) *Attorney, Agent, or Firm* — Dinsmore & Shohl LLP

(57) ABSTRACT

A method of performing deconfliction comprises receiving a request to accept a first operational intent associated with a first unmanned aircraft system, determining whether a conflict exists between the first operational intent and one or more scheduled operational intents, and if a conflict exists between the first operational intent and a second operational intent associated with a second unmanned aircraft system, transmitting data associated with the conflict to a first operator of the first unmanned aircraft system and a second operator of the second unmanned aircraft system, and transmitting information to the first and second operator allowing them to negotiate a resolution of the conflict. If a conflict does not exist, the first operational intent may be accepted. Bids may also be received for a right to utilize a volume of airspace at a particular time and the right may be granted to a highest bidder.

18 Claims, 4 Drawing Sheets

(51) Int. Cl.
*G08G 5/00* (2006.01)
*G08G 5/04* (2006.01)

(52) U.S. Cl.
CPC ......... *G08G 5/0043* (2013.01); *G08G 5/0069* (2013.01); *G08G 5/04* (2013.01); *B64U 2201/20* (2023.01)

(58) Field of Classification Search
CPC .. G08G 5/0026; G08G 5/0043; G08G 5/0069; G08G 5/04; G08G 5/0034; G08G 5/0082; G08G 5/045; G08G 5/0013; G08G 5/00
See application file for complete search history.

(56) References Cited

U.S. PATENT DOCUMENTS

| | | | |
|---|---|---|---|
| 9,292,705 B2 | 3/2016 | Lemmey et al. | |
| 9,508,264 B2 | 11/2016 | Chan et al. | |
| 9,640,078 B2 | 5/2017 | Weber et al. | |
| 9,646,502 B1 | 5/2017 | Gentry | |
| 9,773,422 B2 | 9/2017 | Wouhaybi et al. | |
| 9,847,033 B1 | 12/2017 | Carmack et al. | |
| 10,074,283 B1 | 9/2018 | de Oliveira et al. | |
| 10,134,291 B2 | 11/2018 | Chan et al. | |
| 10,139,836 B2 | 11/2018 | Bostick et al. | |
| 10,147,329 B2 | 12/2018 | Liu et al. | |
| 10,351,239 B2 | 7/2019 | Di Benedetto et al. | |
| 10,535,273 B2 | 1/2020 | Namgoong et al. | |
| 2014/0336932 A1* | 11/2014 | Leones | G08G 5/0034 701/528 |
| 2016/0117929 A1* | 4/2016 | Chan | G06Q 50/30 701/3 |
| 2016/0189549 A1* | 6/2016 | Marcus | G08G 5/0008 701/3 |
| 2018/0218619 A1* | 8/2018 | Brown | G08G 5/0069 |
| 2018/0227627 A1 | 8/2018 | Jabara et al. | |
| 2018/0293898 A1 | 10/2018 | Redmann et al. | |
| 2019/0019418 A1* | 1/2019 | Tantardini | G08G 5/0086 |
| 2020/0290742 A1* | 9/2020 | Kumar | B64D 27/10 |
| 2021/0097870 A1 | 4/2021 | Nakadai et al. | |

OTHER PUBLICATIONS

Aweiss Arwa et al: "Flight Demonstration of Unmanned Aircraft System (UAS) Traffic Management (UTM) at Technical Capability Level 3", 2019 IEEE/AIAA 38th Digital Avionics Systems Conference (DASC), IEEE, Sep. 8, 2019 (Sep. 8, 2019), pp. 1-7, XP033765406, DOI: 10.1109/DASC43569.2019.9081718.

* cited by examiner

SYSTEMS AND METHODS FOR MARKET BASED DECONFLICTION FOR UNMANNED TRAFFIC MANAGEMENT

FIELD

The present disclosure relates to monitoring of unmanned aerial vehicles, and more specifically, to systems and methods for market based deconfliction for unmanned traffic management.

BACKGROUND

Unmanned aerial vehicles, or drones, are increasingly being flown either for commercial or other purposes. As the number of unmanned aerial vehicle flights increases, systems have been developed for managing aerial traffic among these vehicles. Specifically, unmanned traffic management networks monitor aerial vehicles to manage traffic among these aircraft. Unmanned traffic management networks may also accept operational intent, such as flight plans, area based 4-D volumes, and trajectory-based volumes, for unmanned aerial vehicles. When there is a conflict between two or more unmanned aerial vehicles that wish to utilize the same volume of airspace at the same time, the unmanned traffic management network may determine which vehicle is allowed to use the airspace. Currently, airspace acceptance is typically accepted on a first come, first served basis. That is, the first aircraft to request airspace at a particular time is accepted. However, this may not be the most efficient use of airspace. As such, there is a need for an improved method of deconfliction between unmanned aerial vehicles.

SUMMARY

In an embodiment, a method of performing deconfliction may include receiving a request to accept a first operational intent associated with a first unmanned aircraft system and determining whether a conflict exists between the first operational intent and one or more scheduled operational intents. In response to determination that a conflict exists between the first operational intent and a second operational intent associated with a second unmanned aircraft system, the method may include transmitting data associated with the conflict to a first operator of the first unmanned aircraft system and a second operator of the second unmanned aircraft system, and transmitting information to the first operator and the second operator. The information may allow the first operator and the second operator to negotiate a resolution of the conflict. In response to a determination that a conflict does not exist between the first operational intent and one or more scheduled operational intents, the method may include accepting the first operational intent.

In an embodiment, a deconfliction unit may include one or more processors, one or more memory modules, and machine readable instructions stored in the one or more memory modules that, when executed by the one or more processors, may cause the deconfliction unit to receive a request to accept a first operational intent associated with a first unmanned aircraft system and determine whether a conflict exists between the first operational intent and one or more scheduled operational intents. In response to determination that a conflict exists between the first operational intent and a second operational intent associated with a second unmanned aircraft system, the deconfliction unit may transmit data associated with the conflict to a first operator of the first unmanned aircraft system and a second operator of the second unmanned aircraft system, and transmit information to the first operator and the second operator. The information may allow the first operator and the second operator to negotiate a resolution of the conflict. In response to determination that a conflict does not exist between the first operational intent and one or more scheduled operational intents, the deconfliction unit may accept the first operational intent.

In embodiments, a system may include an unmanned traffic management network and a deconfliction unit. The unmanned traffic management network may include one or more unmanned aircraft system service suppliers. The unmanned traffic management network may be configured to monitor one or more unmanned aircraft systems and store scheduled operational intents for the one or more unmanned aircraft systems. The deconfliction unit may be configured to receive a request to accept a first operational intent associated with a first unmanned aircraft system and determine whether a conflict exists between the first operational intent and one or more scheduled operational intents. In response to determination that a conflict exists between the first operational intent and a second operational intent associated with a second unmanned aircraft system, the deconfliction unit may transmit data associated with the conflict to a first operator of the first unmanned aircraft system and a second operator of the second unmanned aircraft system, and transmit information to the first operator and the second operator. The information may allow the first operator and the second operator to negotiate a resolution of the conflict. In response to determination that a conflict does not exist between the first operational intent and one or more scheduled operational intents, the deconfliction unit may accept the first operational intent.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
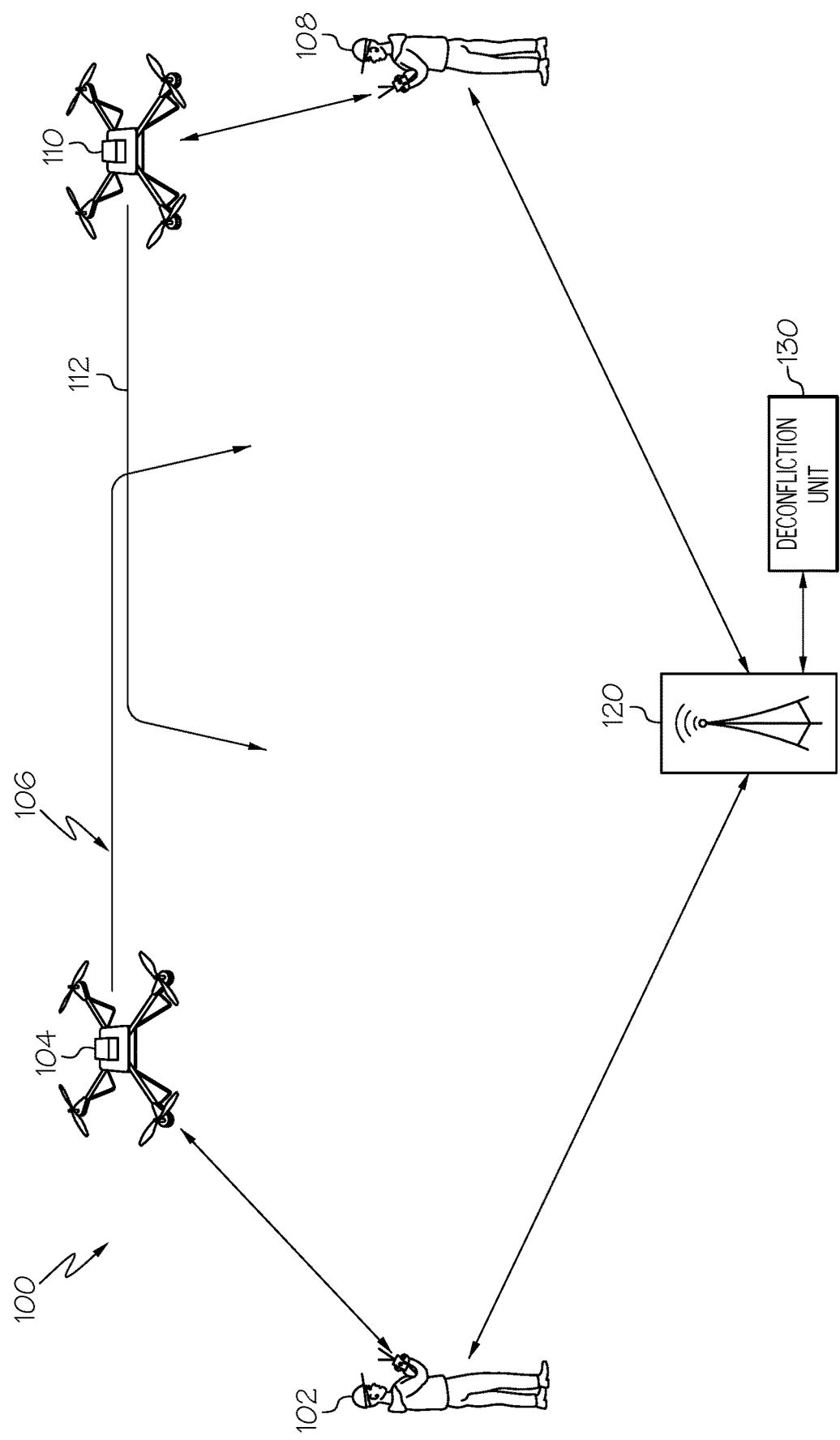
FIG. 1 schematically depicts an exemplary system for performing market based deconfliction for unmanned traffic management, according to one or more embodiments shown and described herein.

The present disclosure generally relates to deconfliction of operational intents between unmanned aircraft systems (UAS). Unmanned aircraft systems may also be referred to herein as unmanned aerial vehicles (UAV) or drones. Disclosed herein are systems and methods for market based deconfliction between UAS. As used herein, deconfliction refers to the process of avoiding conflicts between operational intents of various UAS. Specifically, this disclosure relates to pre-flight deconfliction. That is avoiding conflicting operational intents before a flight is undertaken.

UAS flights may be monitored by unmanned traffic management (UTM) network comprising one or more UAS service suppliers (USS). A USS may manage UAS traffic within a certain geographic area and/or for a certain set of clients. A USS may monitor UAS with either ground based radar tracking and/or by receiving telemetry directly from UAS that identifies their position. In addition to tracking the position of UAS, a USS may communicate with UAS operators to provide instructions to guide UAS along certain routes to avoid collision with other UAS and to otherwise manage airspace, as disclosed herein.

While a single USS may cover a certain geographic area, a plurality of USS may be part of a UTM network to manage air traffic over a larger geographic area. Different USS that are part of a UTM network may communicate with each other to jointly manage UAS air traffic (e.g., one USS may monitor a particular UAS and hand off control to another USS as the USS is leaving its airspace). Because USS are currently less regulated than air traffic control systems for manned aircraft, UAS operators typically sign up for service with the USS of their choice. As such, multiple USS may provide service to clients in overlapping geographic areas, in which case they may communicate with each other to jointly ensure aircraft separation.

Each USS of a UTM network may monitor one or more UAS operated by one of the clients of the USS. A USS may send commands to the operators of the UAS being monitored to ensure that UAS do not collide with each other and to provide other air traffic control features. In some examples, a USS may send commands directly to UAS to modify their operation (e.g., changing their flight path). In addition, multiple USS in a UTM network may communicate with each other to ensure that UAS being monitored by different USS do not collide with each other. USS may also receive supplemental data from other service provides (e.g., information regarding weather, terrain, and the like) and may provide this information to the USS clients.

USS clients may also submit proposed operational intents (e.g., flight plans, operational volumes, etc.) to a UTM network, which may accept or reject the operational intents. As operational intents are accepted by the UTM network, the details of accepted operational intents may be stored by the UTM network. A proposed operational intent may comprise a particular volume of airspace through which a UAS will fly at a particular time. As such, when a UTM network receives a request to accept an operational intent, the UTM network may determine whether any other operational intents (e.g., any other flight plans) are currently scheduled to utilize any portion of the airspace comprising the requested operational intent at the same time, thereby resulting in a conflict. Since two UAS cannot utilize the same airspace at the same time, if a proposed operational intent conflicts with any currently scheduled operational intents, the newly proposed operational intent cannot be accepted without deconfliction.

In some UTM networks, airspace is simply allocated on a first come first served basis. That is, if a proposed operational intent does not conflict with any currently scheduled operational intents, the proposed operational intent is allowed and if the proposed operational intent conflicts with any currently scheduled operational intents, the proposed operational intent is rejected. However, this may not be the most efficient use of airspace. In addition, such systems may be susceptible to denial-of-service attacks. As such, disclosed herein are improved methods of deconfliction.

In one example disclosed herein, when a proposed operational intent conflicts with a currently scheduled operational intent, the conflicting parties may be connected in a peer-to-peer method such that the two parties may communicate with each other and negotiate the use of the airspace. In another example, a centralized bidding system may be utilized to allocate airspace. In this example, unmanned aircraft system operators may bid on blocks of airspace and airspace rights may be granted to the highest bidder. Details of deconfliction methods are disclosed herein.

FIG. 1 depicts an example system 100 for providing deconfliction for unmanned traffic management. In the example of FIG. 1, a first UAS operator 102 desires to fly a first UAS 104 along a first flight path 106 and a second UAS operator 108 desires to fly a second UAS 110 along a second flight path 112. As can be seen in FIG. 1, a portion of the first flight path 106 overlaps with a portion of the second flight path 112. Thus, there is a conflict between the first and second flight paths 106, 112.

In the illustrated example, a UTM network 120 monitors the area surrounding the flight paths 106, 112. The UTM network 120 may comprise one or more USS and may monitor UAS flights within a certain geographic area (e.g., an area that encompasses the flight paths 106, 112). The UTM network 120 may receive data from UAS, UAS operators, or other systems (e.g., ground-based radar systems) indicating positions, trajectories, and other information associated with UAS and may transmit data to the operators of the UAS and/or the UAS themselves to redirect the UAS in order to avoid collisions or otherwise improve air traffic.

In addition, a UAS operator may submit a proposed operational intent to the UTM network 120 seeking acceptance of the operational intent. A proposed operational intent may be submitted some time prior to a desired UAS flight and may comprise data about the desired flight. In one example, a proposed operational intent may comprise a specific route for a UAS. In other examples, a proposed operational intent may include constraints regarding operational parameters of a flight (e.g., flight parameters, operational volume parameters, time parameters, waypoints, cost constraints, and the like). The UTM network 120 may determine whether there is a conflict between the operational intent and any other scheduled operational intents. If no conflict exists, the UTM network 120 may accept the operational intent. However, if there is a conflict, the UTM network 120 may perform deconfliction. In the illustrated example, the UTM network 120 may communicate with a deconfliction unit 130 to perform the deconfliction. The deconfliction unit 130 is discussed in further detail below.

Figure 2:
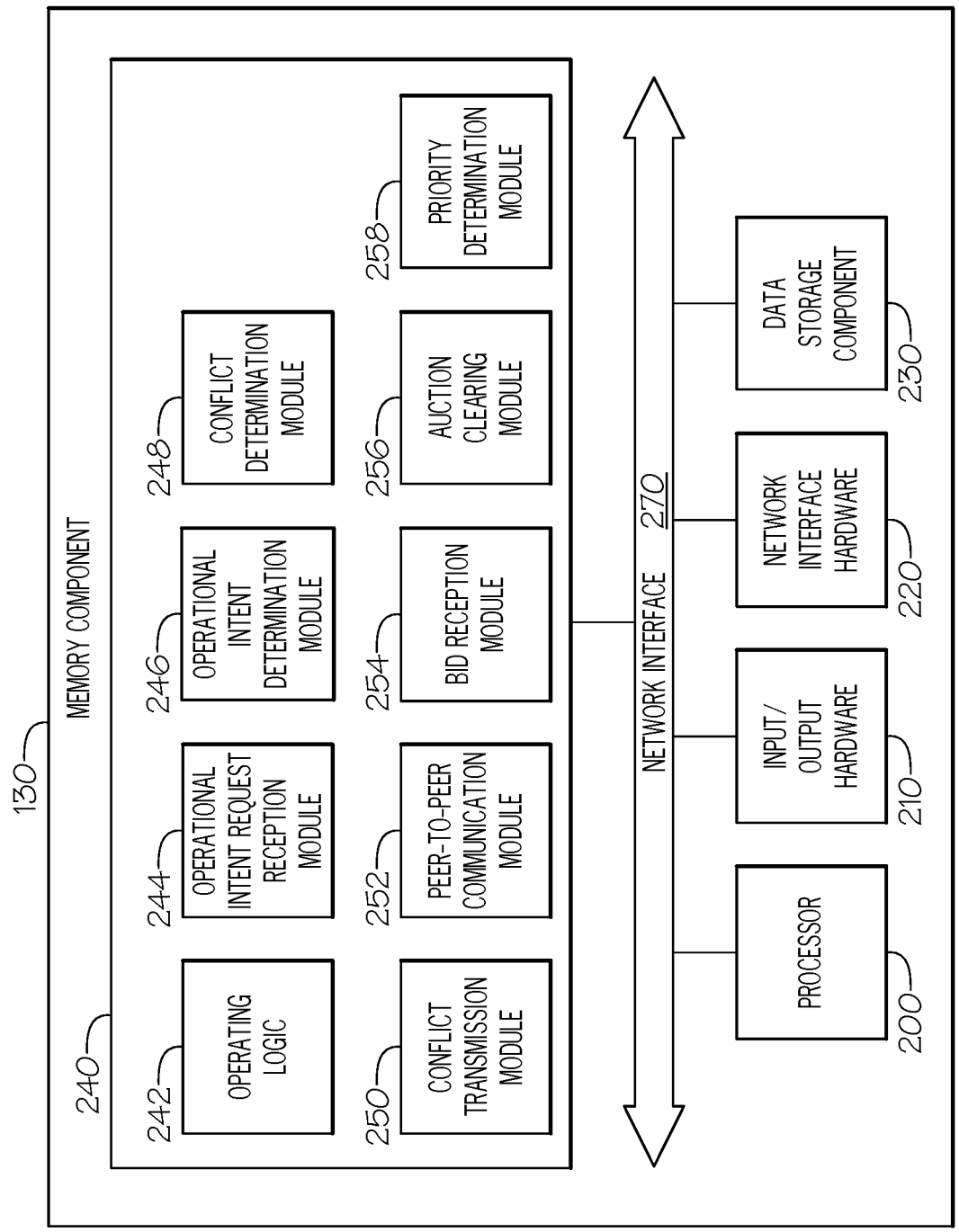
FIG. 2 schematically depicts an example deconfliction unit, according to one or more embodiments shown and described herein.

The deconfliction unit 130 may perform deconfliction as disclosed herein. In the illustrated example, the deconfliction unit 130 is a cloud-based server computing device. However, in other examples, the deconfliction unit 130 may be any type of a computing device (e.g., a mobile computing device, a personal computer, etc.). Additionally, while the deconfliction unit 130 is depicted in FIGS. 1-2 as a single piece of hardware, this is merely an example. In some examples, the deconfliction unit 130 may represent a plurality of computers, servers, databases, etc. In some examples, the deconfliction unit 130 may be configured as a collection of cooperating computing devices or even as a special purpose computer designed specifically for performing the functionality described herein. In the example of FIG. 1, the deconfliction unit 130 is shown as being separate from the UTM network 120. However, in some examples, one or more components of the deconfliction unit 130 may be part of the UTM network 120.

Now referring to FIG. 2, the components of the deconfliction unit 130 are schematically depicted. As illustrated in FIG. 2, the deconfliction unit 130 may include a processor 200, input/output hardware 210, network interface hardware 220, a data storage component 230, and a non-transitory memory component 240. The memory component 240 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242, an operational intent request reception module 244, an operational intent determination module 246, a conflict determination module 248, a conflict transmission module 250, a peer-to-peer communication module 252, a bid reception module 254, an auction clearing module 256, and a priority determination module 258 (each of which may be embodied as a computer program, firmware, or hardware, as an example). A network interface 270 is also included in FIG. 2 and may be implemented as a bus or other interface to facilitate communication among the components of the deconfliction unit 130.

The processor 200 may include any processing component configured to receive and execute instructions (such as from the data storage component 230 and/or the memory component 240). The input/output hardware 210 may include a monitor, keyboard, mouse, printer, camera, microphone, speaker, touch-screen, and/or other device for receiving from, and sending data to the deconfliction unit 130. The network interface hardware 220 may include any wired or wireless networking hardware, such as a modem, LAN port, wireless fidelity (Wi-Fi) card, WiMax card, mobile communications hardware, and/or other hardware for communicating with the UTM network 120, and other networks and/or devices.

The data storage component 230 may store information received from one or more UAS and/or UAS operators. The data stored in the data storage component 230 is discussed in further detail below.

Included in the memory component 240 are operating logic 242, the operational intent request reception module 244, the operational intent determination module 246, the conflict determination module 248, the conflict transmission module 250, the peer-to-peer communication module 252, the bid reception module 254, the auction clearing module 256, and the priority determination module 258. The operating logic 242 may include an operating system and/or other software for managing components of the deconfliction unit 130.

The operational intent request reception module 244 may receive a request from a UAS operator (e.g., UAS operator 102 or UAS operator 108 of FIG. 1) to accept an operational intent for a UAS (e.g., UAS 104 or UAS 110 of FIG. 1). In one example, an operational intent request may include a specific flight path and a specific time for a UAS flight. In another example, a UAS operator may have more flexibility regarding an operational intent and an operational intent request may include a set of constraints regarding one or more operational parameters associated with a desired operational intent rather than an exact flight path and time. Operational parameters may include details associated with an operational intent such as a route of a flight, an altitude of a flight, a time of the flight, and the like. For example, an operational intent request may include a desired starting and ending location of a flight without specifying an exact route between the starting and ending locations. In another example, an operational intent request may include a mission goal or other constraints (e.g., waypoints, a certain geographic area to fly over, time constraints, cost constraints, and the like). In another example, an operational intent request may include a range of acceptable times for a flight. When an operational intent request comprises flexible operational parameters with constraints rather than a specific flight path, the operational intent determination module 246 may determine an operational intent based on specified constraints, as discussed below.

The operational intent determination module 246 may determine an operational intent for an operational intent request received by the operational intent request reception module 244. When the operational intent request includes specific operational parameters for a flight (e.g., a specific flight path and a specific flight time), the operational intent determination module 246 needs not determine an operational intent since the details of the operational intent are fully specified in the operational intent request. However, when the operational intent request comprises flexible operational parameters with certain constraints on those parameters, the operational intent determination module 246 may determine an operational intent that satisfies the constraints on the operational parameters while ensuring that the operational intent does not conflict with any other scheduled operational intent.

When an operational intent is accepted for a UAS, the UTM network 120 and/or the deconfliction unit 130 may store the details of the operational intent. In one example, operational intent data is stored in the data storage component 230 of the deconfliction unit 130. In other examples, operational intent data may be stored remotely from the deconfliction unit 130. As such, the deconfliction unit 130 may access information about scheduled flights in order to perform deconfliction, as disclosed herein.

When the operational intent request reception module 244 receives a request to accept an operational intent comprising constraints on one or more operational parameters, the operational intent determination module 246 may access the data storage component 230 or another location where scheduled operational intents (e.g., flight plans) are stored to identify scheduled operational intents that may conflict with the requested operational intent. The operational intent determination module 246 may then determine whether an operational intent can be arranged that does not conflict with any scheduled operational intents.

For example, if the operational intent request specifies a starting location and an ending location for a flight at a particular time but does not specify an exact route to be taken, the operational intent determination module 246 may determine an operational intent having a route that goes around airspace scheduled to be used by other operational intents at the same time. In another example, if an operational intent request comprises a particular route to be taken for a flight but specifies that the flight may be taken at a variety of different times, the operational intent determination module 246 may select a time for the flight that does not conflict with other scheduled operational intents that utilize the same airspace. In other examples, the operational intent determination module 246 may determine an operational intent to satisfy whatever constraints on operational parameters are specified in an operational intent request. Thus, when an operational intent is requested that has some amount of flexibility in the operational parameters, the operational intent determination module 246 may determine an operational intent having operational parameters that satisfy constraints specified in the operational intent request while ensuring that the operational intent does not conflict with other scheduled operational intents. This may allow for a more efficient use of airspace. In some examples, upon receiving an operational intent request, the operational intent determination module 246 may modify one or more previously accepted operational intents to improve the overall use of airspace.

After the operational intent determination module 246 determines the parameters of an operational intent, the determined operational intent may be transmitted to the UAS operator requesting the operational intent. The operational intent determination module 246 may also store the operational intent in the data storage component 230 and/or transmit the operational intent to the UTM network 120 to be stored.

Referring still to FIG. 2, the conflict determination module 248 may determine whether a conflict exists between a requested operational intent and any scheduled operational intents. As discussed above, the operational intent request reception module 244 may receive a request to accept an operational intent. If the operational intent request includes a specific flight route at a specific time, the conflict determination module 248 may determine whether the flight route and time conflict with another scheduled operational intent.

In one example, the deconfliction unit 130 may divide the airspace covered by the UTM network 120 into a collection of spatio-temporal blocks, wherein each block comprises a 3D volume of airspace and a start and end time. In one example, the spatio-temporal blocks may be pre-determined and remain static. In another example, the spatio-temporal blocks may be dynamic and may change over time. In another example, each flight operation may comprise its own a spatio-temporal block. Then, when an operational intent is accepted and stored by the deconfliction unit 130, the deconfliction unit 130 may determine which spatio-temporal blocks are utilized by the operational intent. That is, the deconfliction unit 130 may determine which airspace blocks are utilized at what times by the operational intent. The spatio-temporal blocks utilized by the operational intent may then be stored in the data storage component 230.

When the operational intent request reception module 244 receives a request to accept an operational intent, the conflict determination module 248 may determine the spatio-temporal blocks that the operational intent will utilize. The conflict determination module 248 may then determine whether any of those spatio-temporal blocks overlap with the spatio-temporal blocks used by any other scheduled operational intents. If there is no overlap, then the conflict determination module 248 determines that there is no conflict. The conflict determination module 248 may then accept the operational intent request and store the operational parameters associated with the operational intent request in the data storage component 230. If there is an overlap between any of the spatio-temporal blocks used by the requested operational intent and any scheduled operational intents, then the conflict determination module 248 determines that there is a conflict.

In some examples, the spatio-temporal blocks may be large enough to accommodate two different UAS utilizing different portions of the same block without their flight paths intersecting. That is, two UAS may be able to share the same spatio-temporal block without conflicting. In these examples, when the operational intent request reception module 244 receives an operational intent request that utilizes a spatio-temporal block of a previously accepted operational intent, the conflict determination module 248 may determine whether the spatio-temporal block requested in the new operational intent request and the previously accepted operational intent may be utilized by both operational intents without conflict, based on the portions of the spatio-temporal block to be utilized by the two operational intents. If the two operational intents are able to utilize the same spatio-temporal block without their flight paths overlapping, then the conflict determination module 248 may determine that there is no conflict, even though both operational intents utilize the same spatio-temporal block.

When the conflict determination module 248 determines that there is a conflict between a requested operational intent and a scheduled operational intent, the conflict transmission module 250 may transmit information regarding the conflict to the conflicting parties. That is, the conflict transmission module 250 may transmit information regarding the conflict to the party requesting the operational intent and the party associated with the conflicting operational intent (e.g., the UAS operator that requested that operational intent). If multiple operational intents conflict with a requested operational intent, then the conflict transmission module 250 may transmit information about the conflict to each of the conflicting parties.

The information regarding the conflict that the conflict transmission module 250 transmits to the conflicting parties may include the time and location of the conflict (e.g., the one or more spatio-temporal blocks that comprise the conflicts). In some examples, the conflict transmission module 250 may also transmit information about the parties involved in the conflict (e.g., UAS operators 102 and 108 in the example of FIG. 1). This may allow the conflicting parties to discuss the conflict and come to an arrangement with each other to resolve the conflict. For example, one of the conflicting parties may agree to modify their operational intent to encompass a different route or to be flown at a different time. In some examples, this communication may be facilitated through the peer-to-peer communication module 252, as discussed below.

The peer-to-peer communication module 252 may facilitate communication between parties that have conflicting operational intents. As explained above, when the conflict determination module 248 determines a conflict between a requested operational intent and an existing operational intent, the conflict transmission module 250 transmits information regarding the conflict to the conflicting parties. In some examples, the conflict transmission module 250 transmits contact information to the conflicting parties (e.g., telephone numbers, e-mail addresses, or the like). The conflicting parties can then contact each other directly and attempt to negotiate and clear the conflict. However, in some examples, the peer-to-peer communication module 252 may be used by the conflicting parties to communicate with each other. In these examples, the peer-to-peer communication module 252 may comprise a messaging system, a messaging board, or another system to facilitate communication between the parties. For example, the peer-to-peer communication module 252 may comprise a secure messaging system that allows the conflicting parties to send messages to each other that are hosted by the deconfliction unit 130. The peer-to-peer communication module 252 may send an e-mail message to a conflicting party when that party has received a message through the peer-to-peer communication module 252. By utilizing a secure messaging system hosted by the deconfliction unit 130, the peer-to-peer communication module 252 may allow parties to securely communicate with each other without revealing personal details of the conflicting parties, thereby maintaining the privacy of the parties.

After establishing communication with each other through the peer-to-peer communication module 252, conflicting parties may discuss the conflict and attempt to amicably resolve the conflict. For example, if one party has more flexibility regarding their operational intent, that party may agree to modify their operational intent accordingly to avoid the conflict. In some examples, one party may offer to pay the other party to induce that party to modify their operational intent. In some examples, the peer-to-peer communication module 252 may facilitate payment between conflicting parties. In some examples, the conflicting parties may agree to share one or more blocks of airspace in certain situations when it is safe to do so (e.g., when there is sufficient visual line of sight or when the UAS involved have appropriate equipment).

If the conflicting parties are able to reach an agreement to avoid the conflict between their respective operational intents, either through the peer-to-peer communication module 252 or by communicating with each other directly, one or more operational intents may then be resubmitted to the deconfliction unit 130. In some examples, the peer-to-peer communication module 252 allows parties to modify and automatically resubmit an operational intent. In other examples, a party modifying an operational intent may directly submit a request for a modified operational intent to the deconfliction unit 130. The modified operational intent request may be received by the operational intent request reception module 244. The operational intent request reception module 244 may then determine if any conflicts exist with the newly submitted operational intent in the manner discussed above. If the newly submitted operational intent does not conflict with any scheduled operational intents, then the operational intent may be stored in the data storage component 230. Alternatively, if the newly submitted operational intent is a modification to a scheduled operational intent, then the parameters of the scheduled operational intent as stored in the data storage component 230 may be modified.

If the conflicting parties are unable to reach an agreement regarding the conflicting operational intents, then the right to use the conflicted airspace may be determined by an auction. Accordingly, the bid reception module 254 may receive bids associated with spatio-temporal blocks of airspace within the geographic area covered by the UTM network 120. As bids are received for blocks of airspace, the bids may be stored in the data storage component 230. In some examples, the deconfliction unit 130 may allow UAS operators to view the highest bids received for each of the airspace blocks associated with the UTM network 120. As such, UAS operators may adjust operational intent requests accordingly.

For example, a UAS operator may review existing bids for airspace blocks and may submit an operational intent that only utilizes blocks of airspace with no bids or with bids of low amounts. Alternatively, the UAS operator may submit an operational intent that only enters a particular airspace block when the operational intent does not intersect with other flight operations within the airspace block. This may encourage UAS operators to schedule operational intents utilizing less popular airspace or operational intents, thereby increasing the efficiency of airspace usage.

In some examples, the UTM network 120 may communicate with other exchanges or entities (e.g., local governments) that manage portions of the airspace within the geographic area managed by the UTM network 120. In these examples, these exchanges may require fees (e.g., takeoff and landing fees). In these examples, these required fees may be stored in the data storage component 230 and the deconfliction unit 130 may allow UAS operators to view these fees. Accordingly, if a UAS operator submits an operational intent that would require the payment of a fee, the UAS operator may be required to submit a bid that includes these fees. The bid reception module 254 may then facilitate bidding between the UAS operator submitting the operational intent request and the exchanges administering the fees.

In some examples, a UAS operator may submit a bid associated with an operational intent request along with the operational intent request. In other examples, a UAS operator may submit a bid for an operational intent only after the conflict transmission module 250 notifies the UAS operator of a conflict. In either case, the bid reception module 254 receives bids from UAS operators for airspace blocks. In some examples, the bid reception module 254 may operate in coordination with a subscription model such as a pay per flight model with dynamic pricing.

In embodiments, there is a deadline to submit bids for airspace blocks that expires a certain duration before the actual use of the airspace. In some examples, different blocks of airspace may have different bid submission deadlines. In some examples, multiple auctions may be held for the same airspace block at different durations before the start time of the use of the airspace. Once the bid submission deadline is reached, the auction clearing module 256 may clear the auction and award the airspace to the highest bidder. The highest bidder may then pay the appropriate cost according to the auction rules. In some examples, the highest bidder pays the amount of their bid. In other examples, other auction rules may be used. For example, second price auction rules may be used where the highest bidder pays the amount bid by the second highest bidder plus some fixed amount. In some examples, a virtual currency managed by the deconfliction unit 130 may be used to facilitate payments. In these examples, if certain parties are routinely winning bids for airspace, the pricing of the virtual currency may be used to prevent inflation or other pricing irregularities.

After payment is received from the winning bid, the auction clearing module 256 then awards the airspace to the highest bidder and stores the details of the operational intent associated with the winning bid in the data storage component 230. This auction method may have the benefit of using a pricing mechanism to award airspace to the highest-value users. In addition, the auction may also generate revenue for the UTM network 120.

In some examples, after a winning bid is awarded but before the actual use of the airspace associated with the winning bid, other UAS operators may still wish to obtain the right to the airspace. In addition, the winning bidder may determine that they no longer need the airspace. As such, the peer-to-peer communication module 252 may allow a winning bidder to communicate with other parties such that they may attempt to negotiate to buy, sell, or trade the right to use certain airspace. If a UAS operator that won a bid for airspace agrees to sell, trade, or donate the right to that airspace to another UAS operator, the peer-to-peer communication module 252 may facilitate the appropriate payment between the parties. In some examples, the deconfliction unit 130 may assess fees for such transactions. The deconfliction unit 130 may also establish other rules regarding such transfers of airspace rights (e.g., there may be a certain time period before airspace is to be used after which the rights to that airspace are not allowed to be transferred).

In some examples, a UAS operator that wins a bid for airspace may decide that they no longer need the airspace and may wish to re-auction the airspace to another UAS operator. As such, in some examples, the winning bidder may submit a request to the deconfliction unit 130 to release the airspace. In some examples, the deconfliction unit 130 may then allow the airspace to be re-auctioned by receiving new bids for the right to airspace after the initial auction has concluded. In these examples, the bid reception module 254 may receive bids in a similar manner as described above with a new deadline for bid submissions. If a new bidder wins the right to the airspace in this subsequent auction, the original winner may be refunded a portion or all of their original bid amount, depending on the amount of the new bid and subject to certain rules and fees.

In the examples described above, market rules may be used to award airspace to UAS operators that submit the highest bid for airspace. This generally awards airspace to the UAS operators that most highly value the airspace, thereby creating an efficient use of airspace. However, there may be examples where pure market rules are not desired. For example, the UTM network 120 may wish to prioritize first responders (e.g., law enforcement aerial vehicles) or delivery of medical supplies over other commercial vehicles. Accordingly, the priority determination module 258 is able to prioritize airspace used as disclosed herein.

When the operational intent request reception module 244 receives an operational intent request, the operational intent request may include an indication of the priority of the UAS that will be used for the operational intent. For example, an operational intent request may be submitted indicating that the operational intent is for a UAS that is a first responder. The priority determination module 258 may verify that the UAS is entitled to priority. For example, each UAS, UAS operator, or UAS operation may have a unique ID number and the deconfliction unit 130 may store a list of ID numbers entitled to priority. In other examples, other methods of verifying that the UAS is entitled to priority may be used.

If the priority determination module 258 determines that the UAS associated with an operational intent request is entitled to priority, then the operational intent request associated with the priority UAS may be given priority over other operational intents. For example, if the conflict determination module 248 determines that the operational intent request associated with the priority UAS conflicts with an existing scheduled operational intent, the deconfliction unit 130 may modify or cancel the existing scheduled operational intent and award the airspace to the priority UAS. Further, a priority UAS may not be able to submit an operational intent particularly far in advance of a flight (e.g., if the priority UAS is responding to an emergency). As such, an operational intent for a priority UAS may be given priority over other operational intents even involving airspace for which an auction has already closed. In this case, the operational intent that is being cancelled to accommodate the priority UAS may be refunded any bid amount paid. In some examples, the UAS operator associated with the cancelled operational intent may be compensated for the loss of the use of the airspace of the original operational intent. For example, the UAS operator may be given priority in rescheduling a new operational intent or may be given a voucher that may be used for future bidding on airspace.

It should be understood that the components illustrated in FIG. 2 are merely illustrative and are not intended to limit the scope of this disclosure. More specifically, while the components in FIG. 2 are illustrated as residing within the deconfliction unit 130, this is a non-limiting example. In some embodiments, one or more of the components may reside external to the deconfliction unit 130.

As mentioned above, the various components described with respect to FIG. 2 may be used to carry out one or more processes and/or provide functionality for performing deconfliction for unmanned aircraft. Illustrative examples of the various processes are described with respect to FIGS. 3-4. Although the steps associated with the blocks of FIGS. 3-4 will be described as being separate tasks, in other embodiments, the blocks may be combined or omitted. Further, while the steps associated with the blocks of FIGS. 3-4 will be described as being performed in a particular order, in other embodiments, the steps may be performed in a different order.

Figure 3:
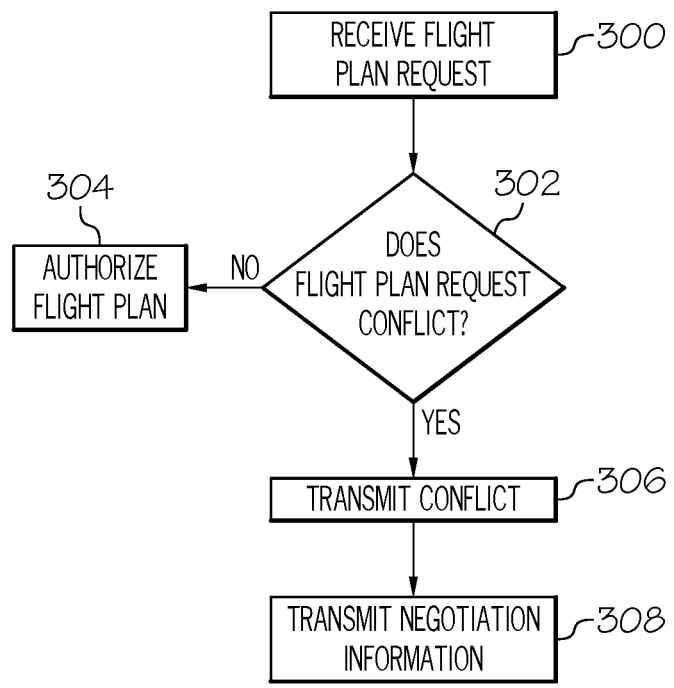
FIG. 3 depicts a flow chart of an illustrative method of performing deconfliction for unmanned aircraft, according to one or more embodiments shown and described herein.

Referring now to FIG. 3, a flow chart is shown of an example method of performing deconfliction for unmanned aircraft, according to one or more embodiments shown and described herein.

At step 300, the operational intent request reception module 244 receives a request to accept a first operational intent associated with a first unmanned aircraft system. In some examples, the operational intent request reception module 244 receives one or more constraints regarding one or more operational parameters associated with the first operational intent. In these examples, the operational intent determination module 246 may determine the operational parameters associated with the first operational intent such that the one or more constraints are satisfied and such that the first operational intent does not conflict with any scheduled operational intents.

At step 302, the conflict determination module 248 determines whether a conflict exists between the first operational intent and one or more scheduled operational intents. The conflict determination module 248 may determine a first set of spatio-temporal blocks to be utilized for the first operational intent. Each of the spatio-temporal blocks includes a volume of airspace and an associated starting time an ending time that the volume of airspace will be utilized. The conflict determination module 248 may then determine that a conflict exists if one or more of the first set of spatio-temporal blocks are to be utilized for one or more scheduled operational intents.

When it is determined that a conflict does not exist between the first operational intent and one or more scheduled operational intents (no at step 302), then, at step 304, the conflict determination module 248 accepts the first operational intent.

When it is determined that a conflict exists between the first operational intent and a second operational intent associated with a second unmanned aircraft system (yes at step 302), then, at step, 306, the conflict transmission module 250 transmits data associated with the conflict to a first operator of the first unmanned aircraft system and a second operator of the second unmanned aircraft system.

At step 308, the conflict transmission module 250 transmits information to the first operator and the second operator such that the first operator and the second operator are able to negotiate a resolution of the conflict. For example, the conflict transmission module 250 may transmit contact information associated with the first and second operators to the first and second operators such that the first and second operators may contact each other to negotiate a resolution of the conflict. Alternatively, the peer-to-peer communication module 252 may establish a secure messaging system that the first and second operator may use to securely communicate with each other. In this example, the conflict transmission module 250 may transmit information to the first operator and the second operator comprising instructions to access the secure messaging system of the peer-to-peer communication module 252.

The peer-to-peer communication module 252 may then facilitate communication between the first operator and the second operator such that they may negotiate a resolution of the conflict. If the first operator and the second operator are able to negotiate a resolution of the conflict, the peer-to-peer communication module 252 may receive a payment from one of the first operator or the second operator, transfer at least a portion of the payment to the other of the first operator or the second operator, receive one or more modifications to one of the first operational intent or the second operational intent, and modify the one of the first operational intent or the second operational intent based on the one or more modifications.

Figure 4:
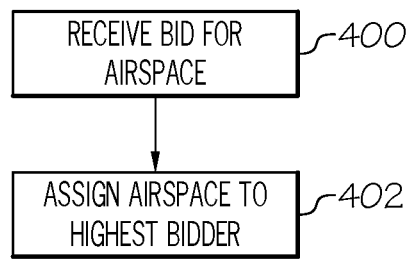
FIG. 4 depicts a flow chart of another illustrative method of performing deconfliction for unmanned aircraft, according to one or more embodiments shown and described herein.

Referring now to FIG. 4, a flow chart is shown of another example method of performing conflict avoidance, according to one or more embodiments shown and described herein.

At step 400, the bid reception module 254 receives one or more bids for a right to utilize a first volume of airspace at a first time. Then, at a predetermined time, the auction clearing module 256 assigns the right to utilize the first volume of airspace at the first time to an operator of an unmanned aircraft system associated with the highest bid at step 402.

Figure 5:
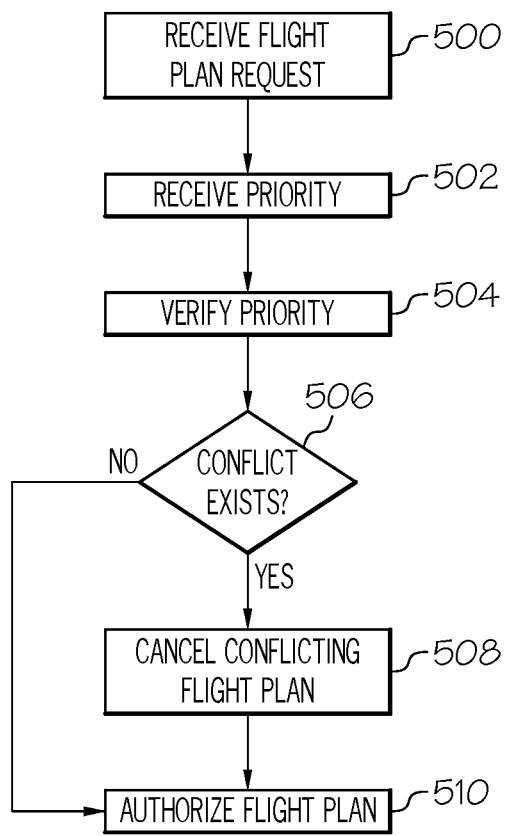
FIG. 5 depicts a flow chart of another illustrative method of performing deconfliction for unmanned aircraft, according to one or more embodiments shown and described herein.

Referring now to FIG. 5, a flow chart is shown of another example method of performing conflict avoidance, according to one or more embodiments shown and described herein.

At step 500, the operational intent request reception module 244 receives a request to accept a first operational intent associated with a first unmanned aircraft system. At step 502, the operational intent request reception module 244 receives a priority associated with the first unmanned aircraft system. At step 504, the priority determination module 258 verifies the priority associated with the first unmanned aircraft system.

At step 506, the conflict determination module 248 determines whether a conflict exists between the first operational intent and one or more scheduled operational intents. When it is determined that a conflict exists between the first operational intent and a second operational intent associated with a second unmanned aircraft system (yes at step 506), the conflict determination module 248 modifies or cancels the second operational intent. Then, at step 510, the conflict determination module 248 accepts the first operational intent. When it is determined that a conflict does not exist between the first operational intent and any scheduled operational intents (no at step 506), then control moves to step 510 and the conflict determination module 248 accepts the first operational intent.

It should now be understood that the devices, systems, and methods described herein provide market based deconfliction for unmanned traffic management. A deconfliction unit may receive operational intent requests for unmanned aircraft systems and may determine whether there are any conflicts between operational intent requests. When there are no conflicts with an operational intent request, the deconfliction unit may accept the operational intent. When there are conflicts with an operational intent request, the deconfliction unit may send a notification to the conflicting parties who may communicate with each other and attempt to negotiate a resolution of the conflict. The deconfliction unit may facilitate communication between the parties and may facilitate payment from one party to the other party for the right to use a certain volume of airspace at a particular time.

The deconfliction unit may also receive bids for the right to utilize one or more volumes of airspace at particular times. The deconfliction unit may post the leading bids such that they may be viewed by potential bidders. At a predetermined time before airspace is to be used, the deconfliction unit may clear the auction and award the use of airspace to the highest bidder. The deconfliction unit may also receive priority information of unmanned aircraft systems (e.g., first responders) and may award airspace based on the priority of aircraft systems.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses.

A method of performing deconfliction comprising: receiving a request to accept a first operational intent associated with a first unmanned aircraft system; determining whether a conflict exists between the first operational intent and one or more scheduled operational intents; in response to determination that a conflict exists between the first operational intent and a second operational intent associated with a second unmanned aircraft system, transmitting data associated with the conflict to a first operator of the first unmanned aircraft system and a second operator of the second unmanned aircraft system; and transmitting information to the first operator and the second operator, the information allowing the first operator and the second operator to negotiate a resolution of the conflict, and in response to determination that a conflict does not exist between the first operational intent and one or more scheduled operational intents, accepting the first operational intent.

The method of any preceding clause, further comprising: determining a first set of spatio-temporal blocks to be utilized for the first operational intent, wherein each of the spatio-temporal blocks comprises a volume of airspace and an associated starting time and an ending time that the volume of airspace will be utilized; and determining that a conflict exists if one or more of the first set of spatio-temporal blocks are to be utilized for one or more scheduled operational intents.

The method of any preceding clause, further comprising: receiving one or more constraints regarding one or more operational parameters associated with the first operational intent; and determining the operational parameters associated with the first operational intent such that the one or more constraints are satisfied and such that the first operational intent does not conflict with any scheduled operational intents.

The method of any preceding clause, further comprising: receiving a payment from one of the first operator or the second operator; transferring at least a portion of the payment to the other of the first operator or the second operator; receiving one or more modifications to one of the first operational intent or the second operational intent; and modifying the one of the first operational intent or the second operational intent based on the one or more modifications.

The method of any preceding clause, further comprising: receiving one or more bids for a right to utilize a first volume of airspace at a first time; and assigning the right to utilize the first volume of airspace at the first time to an operator of an unmanned aircraft system associated with the highest bid.

The method of any preceding clause, further comprising, after assigning the right to utilize the first volume of airspace: receiving a request to release the first volume of airspace at the first time; receiving new bids for the right to utilize the first volume of airspace at the first time; and assigning the right to utilize the first volume of airspace at the first time to an operator of an unmanned aircraft system associated with the highest new bid.

The method of any preceding clause, further comprising: receiving a priority associated with the first unmanned aircraft system; verifying the priority associated with the first unmanned aircraft system; and in response to determination that a conflict exists between the first operational intent and the second operational intent, accepting the first operational intent; and canceling the second operational intent.

The method of any preceding clause, further comprising, in response to determination that a conflict does not exist between the first operational intent and any scheduled operational intents: receiving a payment for one or more fees associated with the first operational intent; and transmitting the payment for the one or more fees to one or more entities that collect the one or more fees.

The method of any preceding clause, wherein at least one of the one or more fees associated with the first operational intent comprises one of a takeoff fee or a landing fee.

A deconfliction unit comprising: one or more processors; one or more memory modules; and machine readable instructions stored in the one or more memory modules that, when executed by the one or more processors, cause the deconfliction unit to: receive a request to accept a first operational intent associated with a first unmanned aircraft system; determine whether a conflict exists between the first operational intent and one or more scheduled operational intents; in response to determination that a conflict exists between the first operational intent and a second operational intent associated with a second unmanned aircraft system: transmit data associated with the conflict to a first operator of the first unmanned aircraft system and a second operator of the second unmanned aircraft system; and transmit information to the first operator and the second operator, the information allowing the first operator and the second operator to negotiate a resolution of the conflict; and in response to determination that a conflict does not exist between the first operational intent and one or more scheduled operational intents, accept the first operational intent.

The deconfliction unit of any preceding clause, wherein the machine readable instructions, when executed, cause the deconfliction unit to: determine a first set of spatio-temporal blocks to be utilized for the first operational intent, wherein each of the spatio-temporal blocks comprises a volume of airspace and an associated starting time and an ending time that the volume of airspace will be utilized; and determine that a conflict exists if one or more of the first set of spatio-temporal blocks are to be utilized for one or more scheduled operational intents.

The deconfliction unit of any preceding clause, wherein the machine readable instructions, when executed, cause the deconfliction unit to: receive one or more constraints regarding one or more operational parameters associated with the first operational intent; and determine the operational parameters associated with the first operational intent such that the one or more constraints are satisfied and such that the first operational intent does not conflict with any scheduled operational intents.

The deconfliction unit of any preceding clause, wherein the machine readable instructions, when executed, cause the deconfliction unit to receive a payment from one of the first operator or the second operator; transfer at least a portion of the payment to the other of the first operator or the second operator; receive one or more modifications to one of the first operational intent and the second operational intent; and modify the one of the first operational intent or the second operational intent based on the one or more modifications.

The deconfliction unit of any preceding clause, wherein the machine readable instructions, when executed, cause the deconfliction unit to: receive one or more bids for a right to utilize a first volume of airspace at a first time; and assign the right to utilize the first volume of airspace at the first time to an operator of an unmanned aircraft system associated with the highest bid.

The deconfliction unit of any preceding clause, wherein the machine readable instructions, when executed, cause the deconfliction unit to, after assigning the right to utilize the first volume of airspace: receive a request to release the first volume of airspace at the first time; receive new bids for the right to utilize the first volume of airspace at the first time; and assign the right to utilize the first volume of airspace at the first time to an operator of an unmanned aircraft system associated with the highest new bid.

The deconfliction unit of any preceding clause, wherein the machine readable instructions, when executed, cause the deconfliction unit to: receive a priority associated with the first unmanned aircraft system; verify the priority associated with the first unmanned aircraft system; and in response to determination that a conflict exists between the first operational intent and the second operational intent, accept the first operational intent; and cancel the second operational intent.

The deconfliction unit of any preceding clause, wherein the machine readable instructions, when executed, cause the deconfliction unit to, in response to determination that a conflict does not exist between the first operational intent and any scheduled operational intents: receive a payment for one or more fees associated with the first operational intent; and transmit the payment for the one or more fees to one or more entities that collect the one or more fees.

The deconfliction unit of any preceding clause, wherein at least one of the one or more fees associated with the first operational intent comprises one of a takeoff fee or a landing fee.

A system comprising: an unmanned traffic management network comprising one or more unmanned aircraft system service suppliers and configured to monitor one or more unmanned aircraft systems and store scheduled operational intents for the one or more unmanned aircraft systems; and a deconfliction unit configured to: receive a request to accept a first operational intent associated with a first unmanned aircraft system; determine whether a conflict exists between the first operational intent and one or more scheduled operational intents; in response to determination that a conflict exists between the first operational intent and a second operational intent associated with a second unmanned aircraft system, transmit data associated with the conflict to a first operator of the first unmanned aircraft system and a second operator of the second unmanned aircraft system; and transmit information to the first operator and the second operator, the information allowing the first operator and the second operator to negotiate a resolution of the conflict, and in response to determination that a conflict does not exist between the first operational intent and one or more scheduled operational intents, accept the first operational intent.

The system of any preceding clause, wherein the deconfliction unit is further configured to: receive one or more bids for a right to utilize a first volume of airspace at a first time; and assign the right to utilize the first volume of airspace at the first time to an operator of an unmanned aircraft system associated with the highest bid.

What is claimed is:

1. A method of performing deconfliction comprising:
   receiving a request to accept a first operational intent associated with a first unmanned aircraft system;
   determining a first set of spatio-temporal blocks to be utilized for the first operational intent, wherein each of the spatio-temporal blocks comprises a volume of airspace and an associated starting time and an ending time that the volume of airspace will be utilized;
   determining whether a conflict exists between the first operational intent and one or more scheduled operational intents based on whether one or more of the first set of spatio-temporal blocks are to be utilized for one or more scheduled operational intents;
   in response to determination that the conflict exists between the first operational intent and a second operational intent associated with a second unmanned aircraft system,
     transmitting data associated with the conflict to a first operator of the first unmanned aircraft system and a second operator of the second unmanned aircraft system; and
     transmitting information to the first operator and the second operator, the information allowing the first operator and the second operator to negotiate a resolution of the conflict, and
   in response to determination that the conflict does not exist between the first operational intent and one or more scheduled operational intents,
     accepting the first operational intent.

2. The method of claim 1, further comprising:
   receiving one or more constraints regarding one or more operational parameters associated with the first operational intent; and
   determining the operational parameters associated with the first operational intent such that the one or more constraints are satisfied and such that the first operational intent does not conflict with any scheduled operational intents.

3. The method of claim 1, further comprising:
   receiving a payment from one of the first operator or the second operator;
   transferring at least a portion of the payment to the other of the first operator or the second operator;
   receiving one or more modifications to one of the first operational intent or the second operational intent; and
   modifying the one of the first operational intent or the second operational intent based on the one or more modifications.

4. The method of claim 1, further comprising:
   receiving one or more bids for a right to utilize a first volume of airspace at a first time; and
   assigning the right to utilize the first volume of airspace at the first time to an operator of an unmanned aircraft system associated with the highest bid.

5. The method of claim 4, further comprising, after assigning the right to utilize the first volume of airspace:
   receiving a request to release the first volume of airspace at the first time;
   receiving new bids for the right to utilize the first volume of airspace at the first time; and
   assigning the right to utilize the first volume of airspace at the first time to an operator of an unmanned aircraft system associated with the highest new bid.

6. The method of claim 1, further comprising:
   receiving a priority associated with the first unmanned aircraft system;
   verifying the priority associated with the first unmanned aircraft system; and
   in response to determination that the conflict exists between the first operational intent and the second operational intent,
   accepting the first operational intent; and
   canceling the second operational intent.

7. The method of claim 1, further comprising, in response to determination that the conflict does not exist between the first operational intent and any scheduled operational intents:
   receiving a payment for one or more fees associated with the first operational intent; and
   transmitting the payment for the one or more fees to one or more entities that collect the one or more fees.

8. The method of claim 7, wherein at least one of the one or more fees associated with the first operational intent comprises one of a takeoff fee or a landing fee.

9. A deconfliction unit comprising:
   one or more processors;
   one or more memory modules; and
   machine readable instructions stored in the one or more memory modules that, when executed by the one or more processors, cause the deconfliction unit to:
     receive a request to accept a first operational intent associated with a first unmanned aircraft system;
     receive one or more constraints regarding one or more operational parameters associated with the first operational intent;
     determine the operational parameters associated with the first operational intent such that the one or more constraints are satisfied and such that the first operational intent does not conflict with any scheduled operational intents;
     determine whether a conflict exists between the first operational intent and one or more scheduled operational intents;
     in response to determination that the conflict exists between the first operational intent and a second operational intent associated with a second unmanned aircraft system:
  transmit data associated with the conflict to a first operator of the first unmanned aircraft system and a second operator of the second unmanned aircraft system; and
  transmit information to the first operator and the second operator, the information allowing the first operator and the second operator to negotiate a resolution of the conflict; and
in response to determination that the conflict does not exist between the first operational intent and one or more scheduled operational intents,
  accept the first operational intent.

10. The deconfliction unit of claim 9, wherein the machine readable instructions, when executed, cause the deconfliction unit to:
  determine a first set of spatio-temporal blocks to be utilized for the first operational intent, wherein each of the spatio-temporal blocks comprises a volume of airspace and an associated starting time and an ending time that the volume of airspace will be utilized; and
  determine that the conflict exists if one or more of the first set of spatio-temporal blocks are to be utilized for one or more scheduled operational intents.

11. The deconfliction unit of claim 9, wherein the machine readable instructions, when executed, cause the deconfliction unit to:
  receive a payment from one of the first operator or the second operator;
  transfer at least a portion of the payment to the other of the first operator or the second operator;
  receive one or more modifications to one of the first operational intent and the second operational intent; and
  modify the one of the first operational intent or the second operational intent based on the one or more modifications.

12. The deconfliction unit of claim 9, wherein the machine readable instructions, when executed, cause the deconfliction unit to:
  receive one or more bids for a right to utilize a first volume of airspace at a first time; and
  assign the right to utilize the first volume of airspace at the first time to an operator of an unmanned aircraft system associated with the highest bid.

13. The deconfliction unit of claim 12, wherein the machine readable instructions, when executed, cause the deconfliction unit to, after assigning the right to utilize the first volume of airspace:
  receive a request to release the first volume of airspace at the first time;
  receive new bids for the right to utilize the first volume of airspace at the first time; and
  assign the right to utilize the first volume of airspace at the first time to an operator of an unmanned aircraft system associated with the highest new bid.

14. The deconfliction unit of claim 9, wherein the machine readable instructions, when executed, cause the deconfliction unit to:
  receive a priority associated with the first unmanned aircraft system;
  verify the priority associated with the first unmanned aircraft system; and
  in response to determination that the conflict exists between the first operational intent and the second operational intent,
    accept the first operational intent; and
    cancel the second operational intent.

15. The deconfliction unit of claim 9, wherein the machine readable instructions, when executed, cause the deconfliction unit to, in response to determination that the conflict does not exist between the first operational intent and any scheduled operational intents:
  receive a payment for one or more fees associated with the first operational intent; and
  transmit the payment for the one or more fees to one or more entities that collect the one or more fees.

16. The deconfliction unit of claim 15, wherein at least one of the one or more fees associated with the first operational intent comprises one of a takeoff fee or a landing fee.

17. A system comprising:
  an unmanned traffic management network comprising one or more unmanned aircraft system service suppliers and configured to monitor one or more unmanned aircraft systems and store scheduled operational intents for the one or more unmanned aircraft systems; and
  a deconfliction unit configured to:
    receive a request to accept a first operational intent associated with a first unmanned aircraft system;
    determine whether a conflict exists between the first operational intent and one or more scheduled operational intents;
    in response to determination that the conflict exists between the first operational intent and a second operational intent associated with a second unmanned aircraft system,
      transmit data associated with the conflict to a first operator of the first unmanned aircraft system and a second operator of the second unmanned aircraft system;
      transmit information to the first operator and the second operator, the information allowing the first operator and the second operator to negotiate a resolution of the conflict;
      receive a payment from one of the first operator or the second operator;
      transfer at least a portion of the payment to the other of the first operator or the second operator;
      receive one or more modifications to one of the first operational intent and the second operational intent; and
      modify the one of the first operational intent or the second operational intent based on the one or more modifications, and
    in response to determination that the conflict does not exist between the first operational intent and one or more scheduled operational intents, accept the first operational intent.

18. The system of claim 17, wherein the deconfliction unit is further configured to:
  receive one or more bids for a right to utilize a first volume of airspace at a first time; and
  assign the right to utilize the first volume of airspace at the first time to an operator of an unmanned aircraft system associated with the highest bid.

* * * * *